May 19, 1959     H. H. NELSON ET AL     2,886,884

DRIVE KEY EXTRACTOR

Filed April 18, 1955

Henry H. Nelson
Albert J. Nelson
*INVENTORS*

2,886,884

DRIVE KEY EXTRACTOR

Henry H. Nelson, Woonsocket, and Albert J. Nelson, Alpena, S. Dak.

Application April 18, 1955, Serial No. 502,046

2 Claims. (Cl. 29—250)

The present invention relates to new and useful improvements in tools for extracting drive keys used for connecting wheels, gears or the like to shafts.

An important object of the invention is to provide a frame within which the wheel or gear is placed and having a front transverse bar equipped with a pressure screw to bear against the outer end of a shaft and a rear transverse bar positioned behind the wheel or gear and equipped with a pin adapted for engaging the drive key for forcing the latter forwardly out of its groove in the shaft by pressure applied to the frame by the screw.

Another object is to construct the frame of detachable side, front and rear frame members to facilitate assembly thereon on wheels of relatively large diameter.

A further object is to provide a tool of this character of simple and practical construction, which is strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
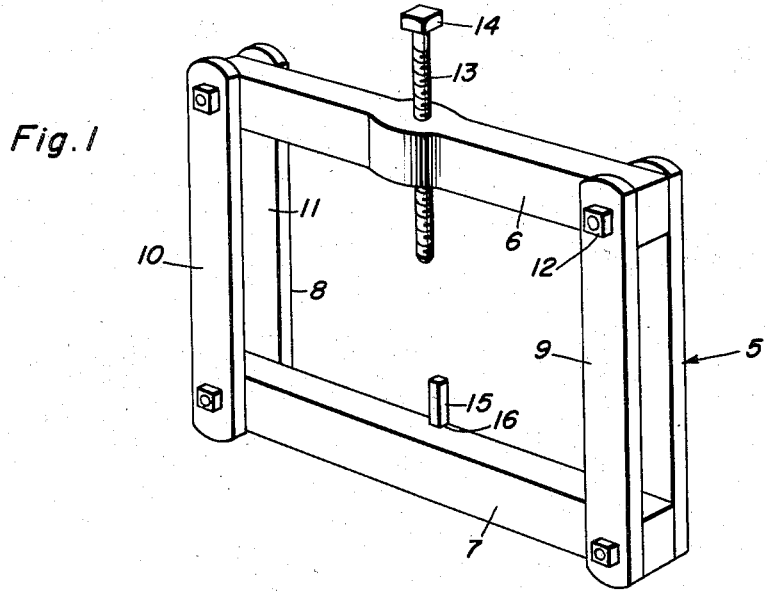
Figure 1 is a perspective view.

Referring now to the drawing in detail, wherein for the purpose of illustration, we have disclosed a preferred embodiment of our invention, the numeral 5 designates a substantially square-shaped frame composed of a front member 6, rear member 7 and side members 8 and 9, the latter being each composed of a pair of parallel links 10 and 11 connected at their end portions to the ends of the front and rear members by bolts and nuts 12.

A pressure screw 13 is threaded in the central portion of the front frame member 6 and is provided at its outer end with a square wrench engaging head 14. A pin 15 is welded or otherwise suitably anchored in a groove 16 in one side of the rear frame member 7 and midway between the ends of the latter to position the pin substantially flush with said side of the rear frame member and with the inner end of the pin projecting inwardly of the frame in opposed relation with respect to the inner end of screw 13.

Figure 2:
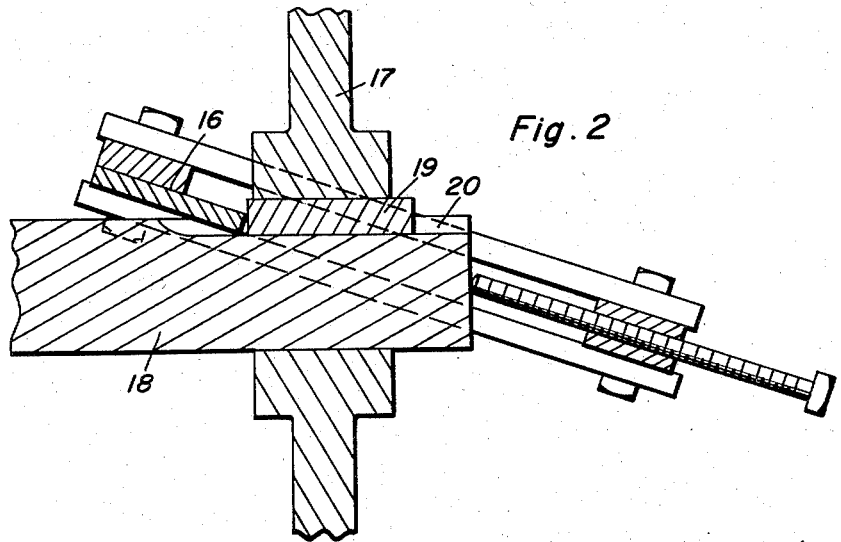
Figure 2 is a vertical sectional view of a wheel and shaft showing the drive key extractor in position thereon.

The frame 5 is placed over a wheel or gear 17 with the rear frame member positioned behind the wheel and resting on a shaft 18 to which the wheel or gear is keyed by a key 19 in a groove 20 in the shaft. The inner end of pin 15 is engaged with the rear end of the key 19 and the inner end of screw 13 engages the outer end of the shaft, as shown in Figure 2, and the screw is turned in a direction to pull the frame forwardly and the engagement of the pin 15 with the key will likewise slide the latter forwardly to remove the same or to expose the front end of the key sufficiently at the front of the wheel to enable the key to be gripped and pulled outwardly. It will be noted that the misalignment of the screw 13 and pin 15 will establish a line of force such that the pin 15 is forced downwardly into the keyway as the key is pushed outwardly.

The device may be used with larger wheels by detaching the side frame members 8 and 9 and sliding the same between the spokes of the wheel to position the rear frame member 7 behind the wheel and then again attaching the frame members to each other.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tool for removing a drive key from a shaft and wheel keyway comprising a substantially square-shaped frame including a front frame member, a rear frame member and a pair of side frame members rigidly connected to each other, said front and rear frame members being the only connecting elements between said side members wherein a unitary center space is provided, a pin fixed to the rear member offset from the longitudinal axis of said member extending forwardly therefrom, said rear frame member adapted to be placed transversely of the shaft behind the wheel, a pressure screw threaded in the front frame member for engaging an adjacent end of the shaft to pull the frame and key forwardly on the shaft whereby the offset relationship between the screw and pin establishes a line of force to urge said pin into said keyway.

2. The construction of claim 1 wherein said side frame members are detachable from at least one of the remaining frame members for insertion of the former between the spokes of the wheel.

References Cited in the file of this patent

UNITED STATES PATENTS

| | | |
|---|---|---|
| 977,018 | Kopietz | Nov. 29, 1910 |
| 1,383,382 | Brackway | July 5, 1921 |
| 1,449,551 | Rock | Mar. 27, 1923 |
| 1,453,895 | Swift | May 1, 1923 |
| 1,634,600 | Thompson | July 5, 1927 |
| 1,661,938 | Follingstad | Mar. 6, 1928 |
| 2,326,741 | Aaberg et al. | Aug. 17, 1943 |